United States Patent
Schaeuffele et al.

(10) Patent No.: US 11,890,680 B2
(45) Date of Patent: Feb. 6, 2024

(54) PISTON FOR A PRINTHEAD OF A 3D PRINTER AND PRINTHEAD FOR A 3D PRINTER

(71) Applicant: Robert Bosch GmbH, Stuttgart (DE)

(72) Inventors: Benjamin Schaeuffele, Vaihingen/Enz (DE); Benjamin Schweizer, Horb (DE); Eberhard Maier, Koengen (DE); Viktor Friedrich, Sersheim (DE)

(73) Assignee: Robert Bosch GmbH, Stuttgart (DE)

( * ) Notice: Subject to any disclaimer, the term of this patent is extended or adjusted under 35 U.S.C. 154(b) by 925 days.

(21) Appl. No.: 16/766,839

(22) PCT Filed: Oct. 15, 2018

(86) PCT No.: PCT/EP2018/078002
§ 371 (c)(1),
(2) Date: Oct. 19, 2020

(87) PCT Pub. No.: WO2019/101438
PCT Pub. Date: May 31, 2019

(65) Prior Publication Data
US 2021/0146430 A1        May 20, 2021

(30) Foreign Application Priority Data

Nov. 27, 2017 (DE) ............... 10 2017 221 156.3
Dec. 5, 2017 (DE) ............... 10 2017 221 959.9

(51) Int. Cl.
*B22D 23/00* (2006.01)
*B33Y 30/00* (2015.01)
(Continued)

(52) U.S. Cl.
CPC .......... *B22F 3/115* (2013.01); *B22D 23/003* (2013.01); *B22F 10/22* (2021.01); *B22F 12/13* (2021.01);
(Continued)

(58) Field of Classification Search
CPC ......... B33Y 30/00; B33Y 10/00; B33Y 40/00; F04B 1/0408; B22F 10/22; B22F 3/115;
(Continued)

(56) References Cited

U.S. PATENT DOCUMENTS 5,598,200 A * 1/1997 Gore .................... B22F 9/08
                                                    347/88
5,749,408 A * 5/1998 Gore .................... B22D 23/00
                                                    164/94
(Continued)

FOREIGN PATENT DOCUMENTS

CN      203804225 U      9/2014
DE      102016224047     6/2018
(Continued)

OTHER PUBLICATIONS

Lee et al. ("Gap Adjustable Molten Metal DoD Inkjet System with Cone-Shaped Piston Head," Journal of Manufacturing Science and Engineering, vol. 130, No. 3, Jun. 2008, pp. 031113-1-031113-5. (Year: 2008).*

(Continued)

*Primary Examiner* — Scott R Kastler
*Assistant Examiner* — Michael Aboagye
(74) *Attorney, Agent, or Firm* — Michael Best & Friedrich LLP

(57) ABSTRACT

The invention relates to a piston (5) for a printhead (1) of a 3D printer, particularly a metal printer, comprising a piston rod (17) and a ram (18), the ram (18) having a discharge side (19) that has a convex or tapering surface (39). The invention also relates to a printhead (1) for a 3D printer, particularly a metal printer, comprising a housing (3), a device (28) for supplying a metal (14), a reservoir (7, 27) for a liquid phase (8) of the metal (14), a nozzle device (2) comprising a guide sleeve (11) and a nozzle plate (9), and a piston (5)

(Continued)

according to one of the preceding claims, the ram (18), the guide sleeve (11) and the nozzle plate (9) forming a displacement chamber (21), and the ram (18) and the guide sleeve (11) forming at least one area (40) for conducting the liquid phase (8) between the reservoir (27) and the displacement chamber (21).

5 Claims, 3 Drawing Sheets

(51) Int. Cl.
    *B22F 3/115*      (2006.01)
    *B22F 10/22*      (2021.01)
    *B22F 12/13*      (2021.01)
    *B22F 12/00*      (2021.01)
    *B22F 12/50*      (2021.01)
    *B22F 12/53*      (2021.01)

(52) U.S. Cl.
    CPC .............. *B22F 12/38* (2021.01); *B22F 12/50* (2021.01); *B22F 12/53* (2021.01); *B33Y 30/00* (2014.12)

(58) Field of Classification Search
    CPC .......... B22F 12/10; B22F 12/50; B22F 12/53; B22F 12/38; B22D 23/003
    USPC ........................................................ 222/596
    See application file for complete search history.

(56) References Cited

U.S. PATENT DOCUMENTS

| | | | | |
|---|---|---|---|---|
| 9,307,625 | B2* | 4/2016 | Rollinger | ............... H05G 2/006 |
| 11,518,084 | B2* | 12/2022 | Schweizer | ............ B29C 64/118 |
| 2018/0099457 | A1* | 4/2018 | Gifford | .................. B33Y 30/00 |

FOREIGN PATENT DOCUMENTS

| | | |
|---|---|---|
| EP | 0822020 | 2/1998 |
| WO | 9622884 | 8/1996 |

OTHER PUBLICATIONS

International Search Report for Application No. PCT/EP2018/078002 dated Nov. 29, 2018 (English Translation, 3 pages).

Lee et al., "Gap Adjustable Molten Metal DoD Inkjet System With Cone-Shaped Piston Head," Journal of Manufacturing Science and Engineering, vol. 130, No. 3, Jun. 2008, pp. 031113-1-031113-5.

Luo, J. et al., "Impact-driven ejection of micro metal droplets on-demand," International Journal of Machine Tools and Manufacture, Elsevier, Amsterdam, NL, vol. 106, Apr. 5, 2016, pp. 67-74.

Lee et al., "Drop-on-Demand Solder Droplet Jetting System for Fabricating Microstructure," IEEE Transactions on Electronics Packaging Manufacturing, IEEE, Piscataway, NY, US, vol. 31, No. 3, Jul. 2008, pp. 202-210.

* cited by examiner

PISTON FOR A PRINTHEAD OF A 3D PRINTER AND PRINTHEAD FOR A 3D PRINTER

BACKGROUND OF THE INVENTION

The invention relates to a piston for a printhead of a 3D printer and to a 3D printer.

A 3D printer for a thermoplastic material receives a solid phase of said material as a starting material, produces a liquid phase therefrom and applies this liquid phase selectively at the locations associated with the object to be produced. A 3D printer of this kind comprises a printhead, in which the starting material is melted. Means for producing a relative movement between the printhead and the work surface on which the object is supposed to be formed are furthermore provided. In this case, it is possible for either only the printhead, only the work surface or, alternatively, both the printhead and the work surface to be moved.

The printhead has a first operating state, in which liquid material emerges from it, and a second operating state, in which no liquid material emerges from it. The second operating state is adopted, for example, if a different position is to be approached on the work surface and no material is supposed to be deposited on the way to said position. It is possible to switch between the two operating states of the printhead, for example, by switching the feed of the solid starting material on and off.

As compared with thermoplastics, metals have a significantly higher melting point and, at the same time, have a significantly lower viscosity in the liquid state.

Document DE102016224047, which had not yet been published at the time of this application, shows a printhead for a 3D printer, in particular a metal printer, comprising a housing, a device for supplying a metal, a piston, a reservoir with an outlet opening and an actuator device for moving the piston.

It is distinguished by the fact that the reservoir has a melting region and a displacement space for a liquid phase of the metal, wherein the melting region adjoins an inert atmosphere and is connected to the displacement space in such a way that the liquid phase of the metal can be induced to pass through the outlet opening by the movement of the piston.

Piston shapes with flat surfaces are known from the prior art. These have the disadvantage that "stagnation zones" can be formed below or in the middle of the surface. In these zones, the melt no longer moves relative to the piston. In the case where gas or air inclusions form in the melt, they cannot move away from the surface of the plunger, and they form unwanted compression zones.

Since metallic melts have a very high surface tension, the very large difference in density between the air and the melt is often not sufficient to enable gas or air inclusions to rise.

Moreover, gas inclusions remain on the surface or on the underside of the plunger when a printhead is put into operation, and complex work steps are required to reduce or discharge the gas inclusions.

If there are gas inclusions in the displacement space during the operation of the 3D printer, these act as a compressible medium and damp the pressure impulse of the plunger, with the result that the printing process may become imprecise or even come to a halt.

It is the underlying object of the invention to provide a piston for a printhead of a 3D printer and a printhead which reduces the effect of gas inclusions in the displacement space, and to provide a printhead which allows suitable removal of the gas inclusions from the displacement space.

SUMMARY OF THE INVENTION

The piston according to the invention for a printhead of a 3D printer, in particular a metal printer, comprises a piston rod and a plunger, wherein the plunger has a pressure side, which has a surface that is convex or tapers to a point.

The surface which is convex or tapers to a point on the pressure side of the plunger ensures a geometry of the plunger which advantageously enables gas inclusions that arise in a liquid phase of a metal to slide off the surface rather than accumulating on the surface of the plunger. During the operation of the 3D printer or a vertical movement of the piston, gas inclusions which arise are driven upward past the surface of the plunger. Depending on the viscosity of the liquid phase of the metal or melt and the buoyancy of the gas or air inclusions, these can slide past the surface of the plunger and are discharged by the latter. Moreover, the geometry of the plunger has the effect that parts of the liquid phase of the metal are replaced by said geometry and thus, advantageously, that less of the liquid phase of the metal contains gas inclusions.

In a preferred embodiment, the surface of the plunger is of conical design. This geometry advantageously enables gas inclusions to slide off the surface of the plunger and not to have a negative effect on the functioning of the printhead.

The cone shape can have different angles, depending on the viscosity of the liquid phase of the metal.

In another embodiment, the surface of the plunger is of spherical design. The spherical shape can have different radii, depending on the viscosity of the liquid phase of the metal.

The printhead according to the invention for a 3D printer, in particular a metal printer, comprises a housing, a device for supplying a metal, a reservoir for a liquid phase of the metal, a nozzle device having a guide sleeve and a nozzle plate, and a piston according to the invention, wherein the plunger, the guide sleeve and the nozzle plate form a displacement space for receiving the liquid phase of the metal. According to the invention, the plunger and the guide sleeve form at least one region for conducting the liquid phase between the reservoir and the displacement space.

The region for conducting the liquid phase of the metal between the reservoir and the displacement space advantageously ensures not only the exchange of the liquid phase but also the transfer or discharge of gas inclusions from the displacement space into the reservoir. The proportion of gas inclusions in the displacement space decisively determines the quality of the functioning of the entire printhead and the reproducibility of the printing results.

The printhead according to the invention furthermore promotes a uniform pressure build-up in the displacement space, thereby allowing improved actuation impulses or an improved discharge of the liquid phase of the metal. The reproducibility of the printing results is thus significantly improved.

In a further development, the region for conducting the liquid phase is designed in such a way that gas inclusions in the liquid phase that occur within the displacement space during a piston stroke can be displaced or discharged through the region, past the pressure side of the plunger, in the direction of the nozzle plate, into the reservoir.

It is thereby advantageously made possible for a relative movement of the liquid phase or melt along the surface of the plunger to be achieved during a stroke motion of the piston. For its part, this flow caused by the stroke motion moves or pushes the gas inclusions along the surface of the plunger and guides them to the region mentioned. Particularly while the printhead is being put into operation, when the plunger is being lowered into the melt, the surface of the pressure side of the plunger distributes the melt, starting from the center of the plunger, and the melt slides along the surface of the plunger, thus advantageously ensuring that gas inclusions are displaced from the displacement space in the direction of the reservoir.

In a further development, the region has a gap for discharging gas inclusions from the displacement space into the reservoir. Discharging the gas inclusions into the reservoir along the surface of the plunger is advantageously simplified by the gap. Particularly while the printhead is being put into operation, when the plunger is being lowered into the melt, the surface of the pressure side of the plunger distributes the melt, starting from the center of the plunger, and the melt slides along the surface of the plunger, thus advantageously ensuring that gas inclusions are displaced from the displacement space in the direction of the reservoir through the gap.

In one embodiment of the gap, said gap is designed as an annular gap.

The shape of the annular gap advantageously enables the gas inclusions to be discharged into the reservoir past the plunger through an angle of 360°.

In another embodiment, the gap is formed as an annular gap in a first plane arranged on the pressure side of the plunger and is formed as at least one axial recess in a second plane. By means of this arrangement, the displacement of gas inclusions from the displacement space into the reservoir is optimized. Moreover, conduction of the liquid phase of the metal or conduction of the melt through the gap is advantageously improved.

In a further development, the nozzle plate has, on its surface formed facing the displacement space, a recess designed to correspond to the surface of the plunger. The recess in the nozzle plate thus has a negative shape of the pressure surface of the plunger, thus enabling the plunger to rest by means of its surface against the surface of the nozzle plate. By virtue of this design of the nozzle plate in combination with the plunger, the printhead advantageously offers the possibility of removing gas inclusions completely from the displacement space by moving the plunger into stop contact with the nozzle plate. In this case, the surface contours of the plunger and of the nozzle plate are matched to one another.

After the plunger has been moved to the nozzle plate, it is then pulled back into a working position within the guide sleeve. To prevent a follow-on flow of air through an outlet opening of the nozzle plate, the outlet opening can be closed by controlled freezing, for example, during the upward movement of the piston. For this purpose, the temperature in the reservoir or the inductor is fully switched off, for example, by reducing the heat output of the inductor. Since the nozzle plate is significantly more exposed relative to the reservoir and has a large relative convection and radiation surface, the solidification of the liquid phase of the metal or melt will generally start from the nozzle plate. As an alternative, it is also possible for nitrogen to be passed to the nozzle plate in a controlled manner via an external nozzle, thereby locally freezing the melt.

The negative effect due to gas inclusions in the displacement space in respect of the formation of droplets during 3D printing is reduced or prevented by the abovementioned features of the invention. The discharge of the gas inclusions ensures adequate venting of the displacement space. On the one hand during startup and, on the other hand, in the case of gas inclusions which arise during the operation of the printhead owing to nonoptimal actuation of the piston, for example, when air is drawn in via the nozzle plate during the return stroke. The consequence of partial or complete stoppage of droplet formation for the production of an object by 3D printing is prevented.

BRIEF DESCRIPTION OF THE DRAWINGS

Further advantageous embodiments of the invention can be found in the description of the drawings, in which illustrative embodiments of the invention that are illustrated in the figures are described in greater detail.

In the drawings.

DETAILED DESCRIPTION

Figure 1:
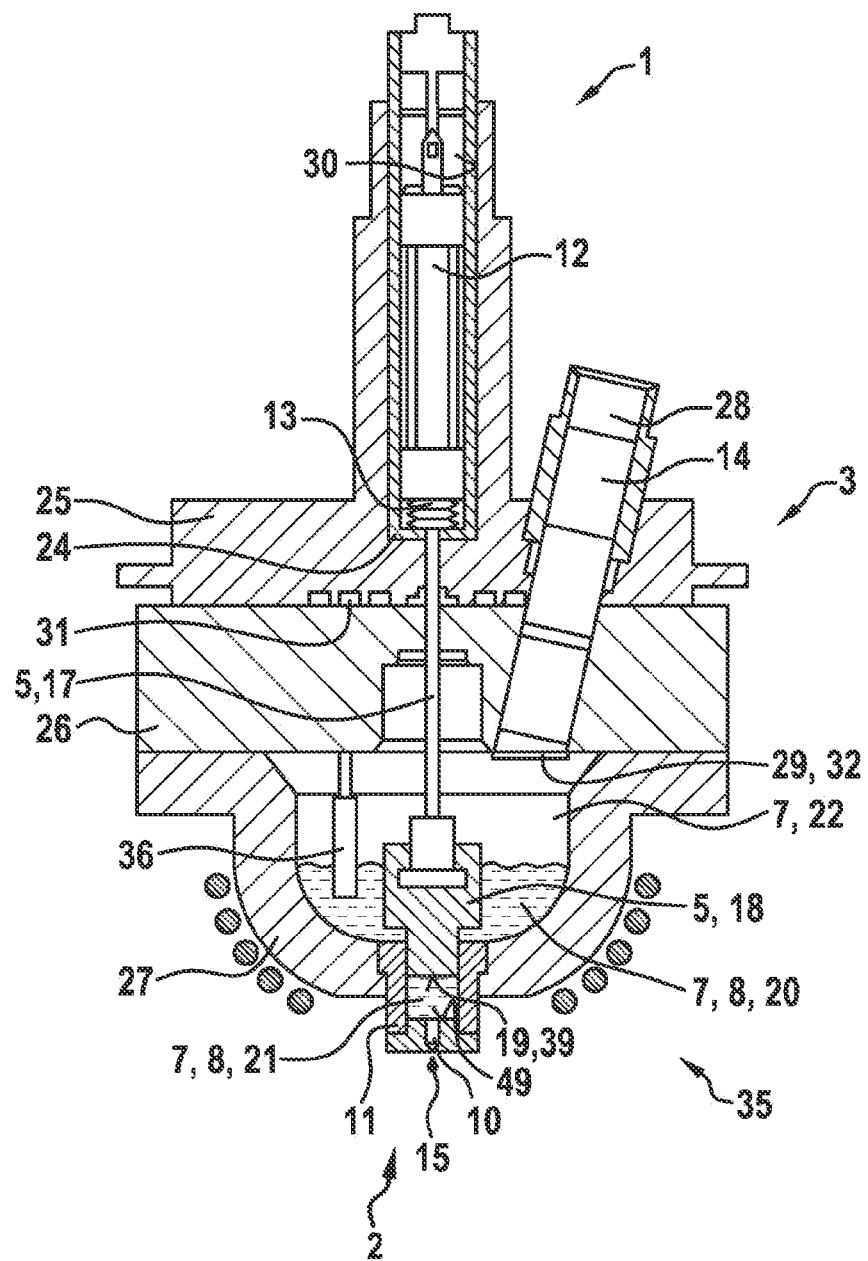
FIG. 1 shows a section through a printhead according to the invention in one embodiment.

FIG. 1 shows an illustrative embodiment of a printhead 1 according to the invention for a 3D printer.

The printhead 1 comprises a housing 3, a device 28 for supplying a metal 14 in the solid phase, a reservoir 7, 27, a nozzle device 2 having an outlet opening 10 and a piston 5. The printhead furthermore comprises an actuator device 12 for moving the piston 5. The reservoir 7, 27 has a melting region 20 and a displacement space 21 for a liquid phase 8 of the metal 14, wherein the melting region 20 adjoins an inert atmosphere 22 and is connected to the displacement space 21 in such a way that the liquid phase 8 of the metal 14 can be induced to pass through the outlet opening 10 by the movement of the piston 5. The liquid phase 8 of the metal 14 or liquid metal 8 is also referred to as the melt 8, and the inert atmosphere 22 is formed by introducing an inert gas 22 into the reservoir 7, 27. The introduction of the inert gas 22 into the reservoir 7, 27 preferably takes place via a cold region of the printhead 1.

The reservoir 7, 27 is designed as a melting crucible 27, wherein an inductor 35 is arranged outside the melting crucible 27, and a sensor 36, in particular a temperature sensor, is arranged within the melting crucible. There may optionally also be an insulator (not illustrated) between the melting crucible 27 and the inductor 35 or inductor coil 35.

The boundary of the inert gas 22 with the liquid metal 8 corresponds to the filling level of the liquid metal 8 in the reservoir 7, 27.

The housing 3 is furthermore of multi-part design, wherein it comprises at least one cooling flange 25, an insulating plate 26 and the reservoir 7, 27.

Temperature-sensitive components of the measuring device can thus advantageously be shielded.

The piston 5 is of multi-part design, wherein it comprises at least one piston rod 17 composed of a metallic material and a plunger 18 composed of a ceramic. Starting from the actuator device 12, the piston rod 17 projects through the cooling flange 25 and the insulating plate 26 and into the reservoir 7, 27, where it merges into the plunger 18.

The cooling flange 25 has a recess 30 for receiving the actuator device 12, which is designed as a piezoelectric actuator 12. During operation, the piezoelectric actuator 12 is fixed in the recess 30 in such a way that, when a voltage is applied, it exerts a working stroke on the piston 5, more specifically on the piston rod 17 of the piston 5. The piston rod 17 transmits the working stroke to the plunger 18, with the result that said plunger induces the liquid phase 8 of the metal 14 to pass through the outlet opening 10. Without actuation by the actuator 12, the piston 5 can be reset to an initial position by a spring 13, wherein the spring 13 is arranged in the recesses 30 of the cooling flange 25, between an offset 24 and the actuator 12. The spring 13 is designed as a Belleville spring.

The cooling flange 25 furthermore has cooling channels 31 for cooling. The cooling channels 31 are arranged between the cooling flange 25 and the insulating plate 26 and a cooling medium flows through them. This serves for cooling to counteract the heating by the melt 8 and to cool the actuator 12 in operation. The cooling flange 25 is formed from a metallic material.

The insulating plate 26, which rests against the cooling flange 25 on the same side as the cooling channel 31 is formed from a thermally insulating material and is designed in such a way that it avoids heat transfer from the reservoir 7, 27 to the cooling flange 25.

The device 28 for supplying the metal 14 or replenishing unit 28 opens into the reservoir 7, 27 and is arranged in the cooling flange 25 and in the insulating plate 26. The replenishing unit 28 projects through the cooling flange 25 and the insulating plate 26, and the metal 14 or material 14 to be printed can be supplied from the outside by the device 28. Pre-dosed pieces of material or pellets can preferably be used. At the transition from the insulating plate 26 to the reservoir 7, 27 there is an opening 29, through which the material 14 enters the reservoir 7, 27. The opening 29 can be closed by a device 32, with the result that said opening is preferably open only while the material 14 is being supplied, thereby reducing the escape of energy or gas from the inert atmosphere 22.

The metal 14 passes in a solid phase 14 into the melting region 20 of the melting crucible and is heated by the inductor 35 until it changes to a liquid phase 8. When a desired process temperature of the melt 8 is reached, which is determined by the temperature sensor 36, the printhead 1 can begin operation. The pressure side 19 of the plunger 18 of the piston 5 is surrounded in the melt 8 or by melt 8, and the side on which it is connected to the piston rod 17 is surrounded in the inert atmosphere 22 or by the inert atmosphere 22. By virtue of the process involved, the piston rod 17 does not come into contact with the melt 8.

The ceramic of the plunger 18 advantageously has very high thermal conductivity to enable the heat produced by the inductor 35 to be transferred efficiently into the displacement space 21.

When the piezoelectric actuator 12 is actuated, the pressure side 19, or surface 39 of the plunger 18, which is pointed or conical in this embodiment, exerts a pressure or stroke on the melt 8 in the displacement space 21 in the direction of the outlet opening 10 and ensures that a droplet 15 is discharged through the nozzle device 2 or outlet opening 10 of the nozzle device 2. The nozzle device 2, in particular the nozzle plate 9, is interchangeable, thereby allowing the use of different nozzle geometries. The figure illustrates a nozzle plate 9 with a flat upper side 49, in which a recess for the outlet opening 10 is arranged. In a further development, which is not illustrated for this illustrative embodiment, the nozzle plate 9 can have, on its surface 49 formed facing the displacement space 21, a recess designed to correspond to the surface 39 of the plunger 18.

Figure 2:
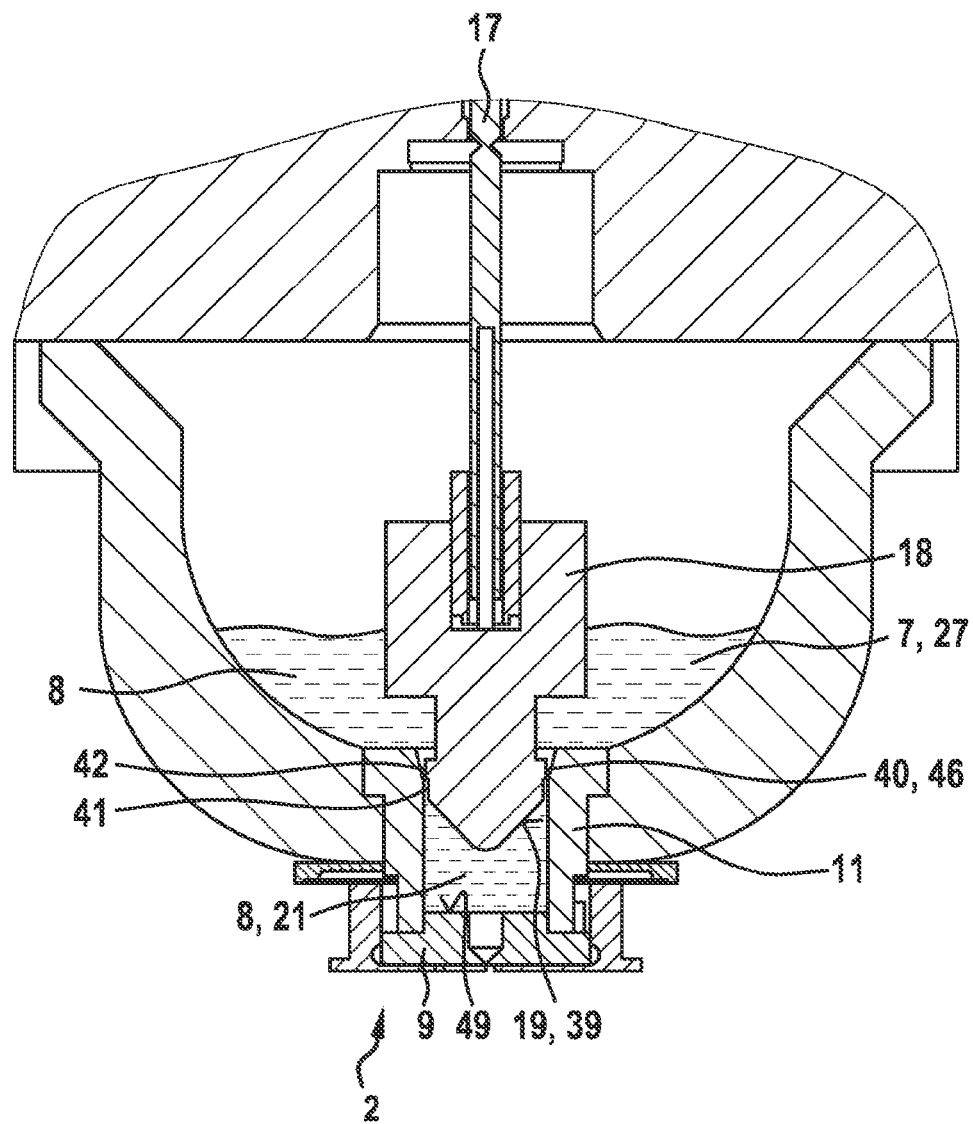
FIG. 2 shows a detailed illustration of a piston according to the invention with a guide sleeve in another embodiment.

FIG. 2 shows a detailed illustration of the piston 17 according to the invention with the guide sleeve 11 in another embodiment, wherein the pressure side 19 of the plunger 18 has a convex surface 39, more specifically a conical surface 39. In an illustrative embodiment which is not illustrated, it is also possible for the surface 39 of the plunger to be of spherical design. Furthermore, FIG. 2 illustrates a detail of the printhead 1 according to the invention, wherein the plunger 18 and the guide sleeve 11 form at least one region 40 for conducting the liquid phase 8 between the reservoir 27 and the displacement space 21.

The region 40 is designed in such a way that gas inclusions in the liquid phase 8 that occur within the displacement space 21 during a piston stroke can be displaced through the region 40, past the pressure side 19 of the plunger 18, in the direction of the nozzle plate 9, into the reservoir 7, 27. The region 40 has a gap 46 for discharging gas inclusions from the displacement space 21 into the reservoir 7, 27, and is designed as an annular gap in a first plane 41 arranged on the pressure side 19 of the plunger 18, and is designed as at least one axial recess in a second plane 42.

In a simple embodiment which is not illustrated, the gap 46 can be designed exclusively as an annular gap.

It is advantageous if the second plane has partial regions (not illustrated) by which the plunger 18 is guided concentrically in the circular guide sleeve 11.

The figure illustrates a nozzle plate 9 with a flat upper side 49, in which a recess for the outlet opening 10 is arranged. In a further development, which is not illustrated for this illustrative embodiment, the nozzle plate 9 can have, on its surface 49 formed facing the displacement space 21, a recess designed to correspond to the conical surface 39 of the plunger 18.

Figure 3:
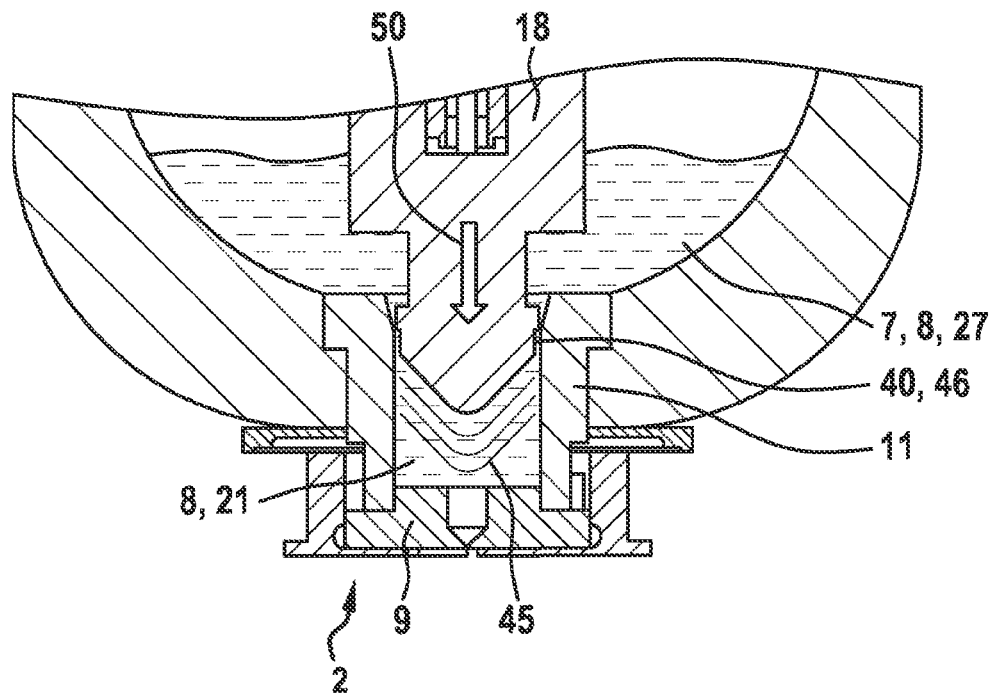
FIG. 3 shows an illustration of pressure waves in a printhead.

FIG. 3 shows an illustration of pressure waves 45 in the displacement space 21 of the printhead 1, which are produced by a stroke motion of the piston 5 or plunger 18.

The surface 39 or surface contour of the plunger 18 has no effect on the actuation or pressure impulse in the direction 50 of the nozzle plate 9 since the pressure wave 45 continues to be actuated in the axial direction 50 of the nozzle plate 9. The propagation of the pressure waves 45 takes place collinearly with the piston movement.

In fact, the purpose of the shape of the surface 39 of the plunger 18 is to enable the melt 8 to sweep directly along the surface 39 by virtue of a streamlined contour or surface 39 of the plunger 18 during immersion or even during the high-frequency actuation, with the result that as far as possible a laminar flow of the melt 8 is achieved. At least during operation, gas inclusions which arise slide off the surface 39 of the plunger 18 and pass through the gap 46 in the region 40 between the plunger 18 and the guide sleeve 11 into the reservoir 27.

If unwanted gas inclusions are present in the melt 8 in the displacement space 21, it is possible, for example, for the entire plunger 18 to be retracted from the melt 8 and then lowered again slowly in order to enable gas inclusions that are present to slide off the surface 39 of the plunger 18 by virtue of the penetration of the plunger 18 into the melt 8.

Figure 4:
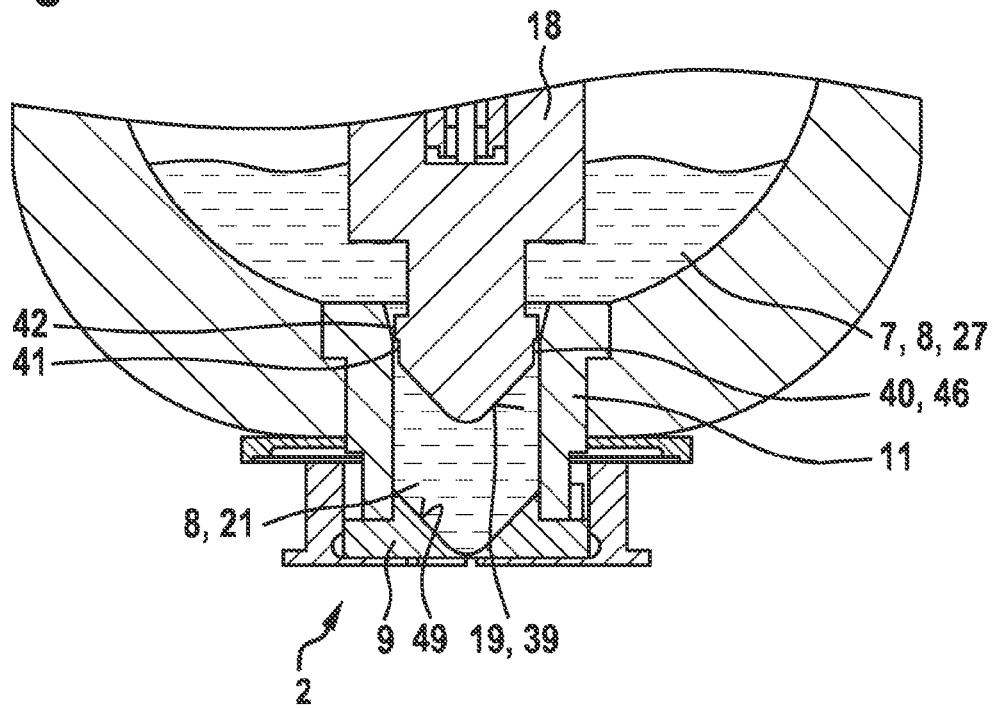
FIG. 4 shows a detailed illustration of a piston according to the invention with a guide sleeve in another embodiment.

FIG. 4 shows another embodiment of the printhead 1, wherein the plunger 18 of the piston 5 has a pressure side 19 with a convex, in particular conical, surface 39. Furthermore, the plunger 18 and the guide sleeve 11 form the region 40 for the conduction of the liquid phase 8 between the reservoir 27 and the displacement space 21, wherein the gap 46 is designed as an annular gap in the first plane 41 arranged on the pressure side 19 of the plunger 18 and as at least one axial recess in the second plane 42.

The nozzle plate 9 has, on its surface 49 formed facing the displacement space 21, a recess designed to correspond to the surface 39 of the plunger 18. The recess in the nozzle plate 9 thus has a negative shape of the pressure surface 19 of the plunger 18, thus enabling the plunger 18 to rest by means of its surface 39 against the surface 49 of the nozzle plate 9 or to enter completely.

The embodiment illustrated here enables degassing or venting before operation or as the printhead 1 is being put into operation, in addition to the optimized plunger geometry, by means of which improved degassing of the displacement space 11 is possible.

To remove the gas inclusions from the melt 8 of the displacement space 21, the plunger 18 should be moved fully, if possible into contact, into the recess in the nozzle plate 9. This ensures that there are no longer any gas inclusions between the surface 39 of the plunger 18 and the surface 49 of the nozzle plate 9. As the plunger 18 is retracted into a working position within the guide sleeve 11, filling of the displacement space 21 with the liquid phase 8 of the metal from the reservoir 27 through region 40 takes place.

To prevent a follow-up flow of gas through the outlet opening 10 in the nozzle plate 9 into the displacement space 21, the outlet opening 10 can be closed. Either mechanically by means of a closure device (not illustrated) or by means of controlled cooling of the region around the outlet opening 10.

Cooling is achieved, for example, by reducing the temperature in the reservoir or crucible by reducing the heat output of the inductor 35. Since the nozzle plate 9 is significantly more exposed relative to the crucible 27 and has a large relative convection and radiation surface, the solidification of the melt will generally start from the nozzle plate 9.

In another variant, the nozzle plate 9 or outlet opening 10 can also be frozen locally by applying liquid nitrogen.

The liquid nitrogen can be directed onto the nozzle plate through a nozzle (not illustrated), for example. After the filling of the displacement space 21 with melt 8, the frozen melt 8 within the outlet opening 10 liquefies, thus ensuring that the printhead is once again ready for operation.

What is claimed is:

1. A printhead (1) for a 3D printer, the printhead (1) comprising:
   a piston (5) for a printhead (1) of a 3D printer, the piston (5) comprising a piston rod (17) and a plunger (18) connected to the piston rod (17), wherein the plunger (18) has a pressure side (19), which has a surface (39) that is convex or tapers to a point,
   a housing (3);
   a device (28) for supplying a metal (14);
   a reservoir (7, 27) for a liquid phase (8) of the metal (14); and
   a nozzle device (2) having a guide sleeve (11) and a nozzle plate (9),
   wherein the plunger (18), the guide sleeve (11) and the nozzle plate (9) form a displacement space (21),
   wherein the plunger (18) and the guide sleeve (11) form at least one region (40) for conducting the liquid phase (8) between the reservoir (27) and the displacement space (21),
   wherein the region (40) has a gap (46) for a discharge of gas inclusions from the displacement space (21) into the reservoir (7, 27), and
   wherein the gap (46) is formed as an annular gap in a first plane (41) arranged on the pressure side (19) of the plunger (18) and is formed as at least one axial recess in a second plane (42).

2. The printhead as claimed in claim 1, characterized in that the surface (39) of the plunger is conical.

3. The printhead as claimed in claim 1, characterized in that the surface (39) of the plunger is spherical.

4. The printhead (1) as claimed in claim 1, wherein a gas inclusion displacement path for displacing gas inclusions in the liquid phase (8) that occur within the displacement space (21) during a piston stroke extends through the region (40), past the pressure side (19) of the plunger (18), in a direction of the nozzle plate (9), and into the reservoir (7, 27).

5. The printhead (1) as claimed in claim 1, characterized in that the nozzle plate (9) has, on a surface (49) formed facing the displacement space (21), a recess corresponding to the surface (39) of the plunger (18).

* * * * *